(12) United States Patent
Aoba et al.

(10) Patent No.: US 11,546,502 B2
(45) Date of Patent: Jan. 3, 2023

(54) IMAGE PROCESSING APPARATUS AND METHOD OF CONTROLLING THE SAME

(71) Applicant: CANON KABUSHIKI KAISHA, Tokyo (JP)

(72) Inventors: Masato Aoba, Tokyo (JP); Koichi Takeuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/405,167

(22) Filed: Aug. 18, 2021

(65) Prior Publication Data
US 2022/0086359 A1 Mar. 17, 2022

(30) Foreign Application Priority Data

Sep. 14, 2020 (JP) .............................. JP2020-154008
Jun. 9, 2021 (JP) .............................. JP2021-096752

(51) Int. Cl.
*H04N 5/232* (2006.01)
*G03B 13/36* (2021.01)

(52) U.S. Cl.
CPC ....... *H04N 5/232122* (2018.08); *G03B 13/36* (2013.01); *H04N 5/23219* (2013.01); *H04N 5/232125* (2018.08); *H04N 5/232945* (2018.08)

(58) Field of Classification Search
CPC ....... H04N 5/232122; H04N 5/232125; H04N 5/23219; H04N 5/232945; H04N 5/232127; G03B 13/36
See application file for complete search history.

(56) References Cited

U.S. PATENT DOCUMENTS

| | | | | |
|---|---|---|---|---|
| 2011/0115967 | A1* | 5/2011 | Lee | H04N 5/23219 348/E5.045 |
| 2011/0292276 | A1* | 12/2011 | Terashima | H04N 5/232127 348/E5.045 |
| 2014/0043522 | A1* | 2/2014 | Hamano | H04N 5/23219 348/349 |
| 2019/0304284 | A1 | 10/2019 | Takeuchi et al. | |
| 2020/0250471 | A1 | 8/2020 | Saruta et al. | |

FOREIGN PATENT DOCUMENTS

JP 2019-121860 A 7/2019

OTHER PUBLICATIONS

Redmon, J. et al., "YOLOv3: An Incremental Improvement" arXiv: 1804.02767v1 (Apr. 2018) pp. 1-6.

\* cited by examiner

*Primary Examiner* — Shahbaz Nazrul
(74) *Attorney, Agent, or Firm* — Carter, DeLuca & Farrell LLP

(57) ABSTRACT

An image processing apparatus is operable to determine a focus target area of an image capturing apparatus. The apparatus comprises: an obtainment unit configured to obtain a first area to be a focus target in a first image captured by the image capturing apparatus at a first point in time, a detection unit configured to detect a second area to be a focus target candidate from a second image captured by the image capturing apparatus at a second point in time succeeding a first point in time; and a determination unit configured to determine, based on the first area and the second image, a focus target area in the second image from among one or more partial areas in the second area.

18 Claims, 9 Drawing Sheets

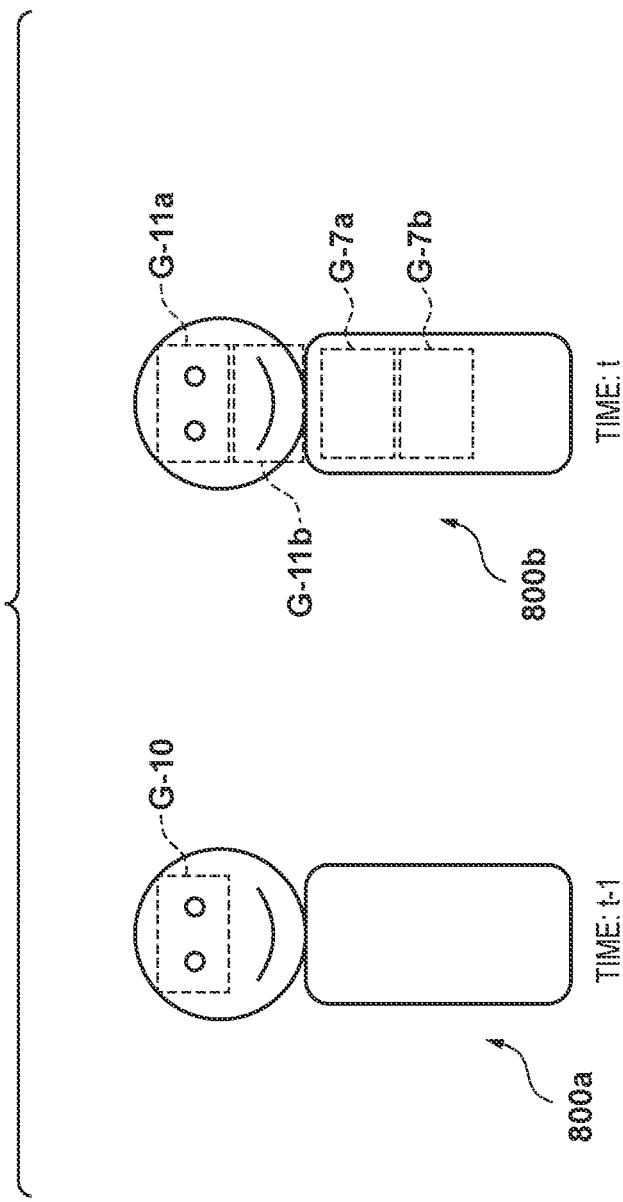

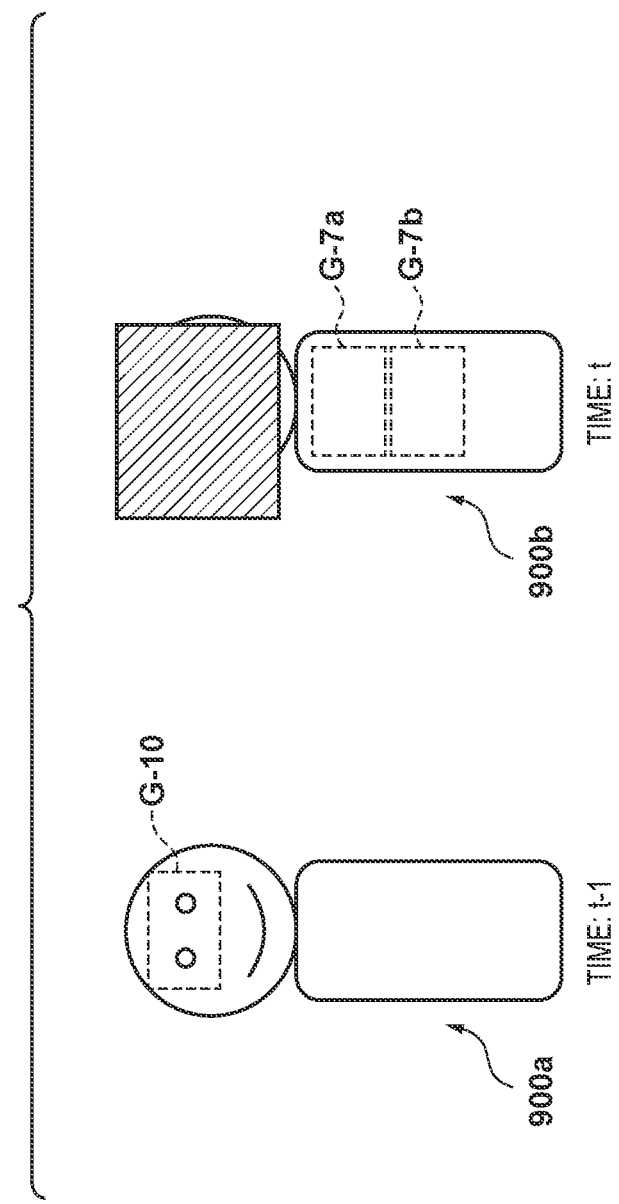

IMAGE PROCESSING APPARATUS AND METHOD OF CONTROLLING THE SAME

BACKGROUND OF THE INVENTION

Field of the Invention

The present invention relates to a technique for determining an image area.

Description of the Related Art

In shooting with a camera, there are autofocus (AF) functions for automatically adjusting focus. As for methods of selecting a region on which to focus when shooting (hereinafter focus target area), there are methods such as a method in which the user manually selects a region using a touch panel or the like and a method of automatically selecting a region based on a detection result such as face detection or object detection. Regardless of the method used to select the focus target area, there are cases where a position or a shape of the focus target area in an image changes due to the movement of an object in the selected focus target area, or the camera itself. In such cases, tracking or continuously detecting the selected focus target area makes it possible to continue AF on an area that the user desires.

Japanese Patent Laid-Open No. 2019-121860 (patent literature 1) discloses a method of performing AF in which a pupil area is detected and then used for a focus target area. According to this method, a focus target area whose distance from the camera is constant is used; accordingly, it is possible to accurately adjust focus.

However, in the method described in patent literature 1, it is necessary to detect a specific portion such as a pupil. Accordingly, it cannot be applied in a case where it is impossible to observe such a specific portion due to it being occluded by another object or the like. Also, in the method described in patent literature 1, it is difficult to accurately adjust focus in a case where a difference in depth (distance from the camera) in the focus target area is large. Accordingly, application is difficult in a case where one wishes to set a sizable body part such as a torso portion or an arm as a focus target area.

SUMMARY OF THE INVENTION

According to one aspect of the present invention, an image processing apparatus operable to determine a focus target area of an image capturing apparatus, the apparatus comprises: an obtainment unit configured to obtain a first area to be a focus target in a first image captured by the image capturing apparatus at a first point in time; a detection unit configured to detect a second area to be a focus target candidate from a second image captured by the image capturing apparatus at a second point in time succeeding a first point in time; and a determination unit configured to determine, based on the first area and the second image, a focus target area in the second image from among one or more partial areas in the second area.

According to the present invention, it is possible to provide a technique for enabling a selection of a focus target area on which AF can be suitably executed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view describing a comparison of a reference area and a partial head area.

FIG. 9 is a view describing a comparison of a reference area and a partial torso area.

DESCRIPTION OF THE EMBODIMENTS

Figure 1:
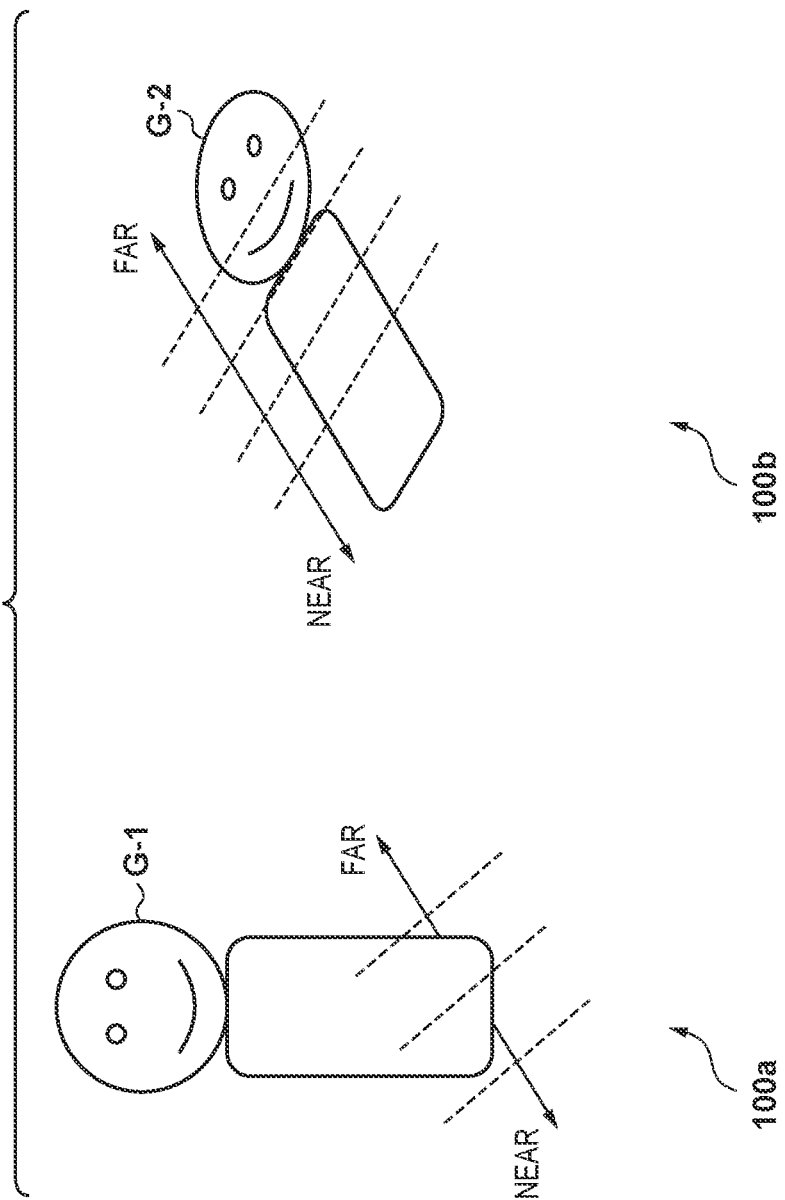
FIG. 1 is a view illustrating a positional relationship between a camera and a subject.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As a first embodiment of an image processing apparatus according to the present invention, description will be given in the following using an example of an autofocus (AF) system that includes an image shooting apparatus and an area selection apparatus. In particular, in the first embodiment, the AF system detects a human body based on an image obtained from the image shooting apparatus and, from among the detected human body area, extracts a focus target area on which to adjust focus.

<Apparatus Configuration>

FIG. 1 is a view illustrating a positional relationship between the image shooting apparatus (camera) and a subject. An image 100a indicates an example of a subject G-1 which is a human body in a state of an upright position, and an image 100b indicates an example of a subject G-2 which is a human body in a state of a supine position. Note that the camera is in the bottom-left direction of the drawing, and a plurality of dotted lines indicating distances (depth) from the camera are illustrated.

As illustrated in FIG. 1, the distance of each body part from the camera changes depending on the orientation of the subject. For example, in a case of an upright position as indicated by the subject G-1, the distance of the camera does not change much regardless of the body part. Meanwhile, in a case where the subject is lying approximately parallel to the line of sight direction of the camera as indicated by the subject G-2, the depth changes significantly in accordance with the body part. Also, in a case where the amount of change in depth across the subject is wider than the depth of field of the image capturing apparatus, it is generally impossible to adjust focus on the entire subject. As a result, there are cases where it becomes impossible to continuously execute suitable AF. In view of this, in the first embodiment, an example in which even in a case where the amount of change in depth across a subject is wider than the depth of field of the image capturing apparatus, it is possible to continuously realize a suitable AF will be described.

<Apparatus Configuration>

Figure 2:
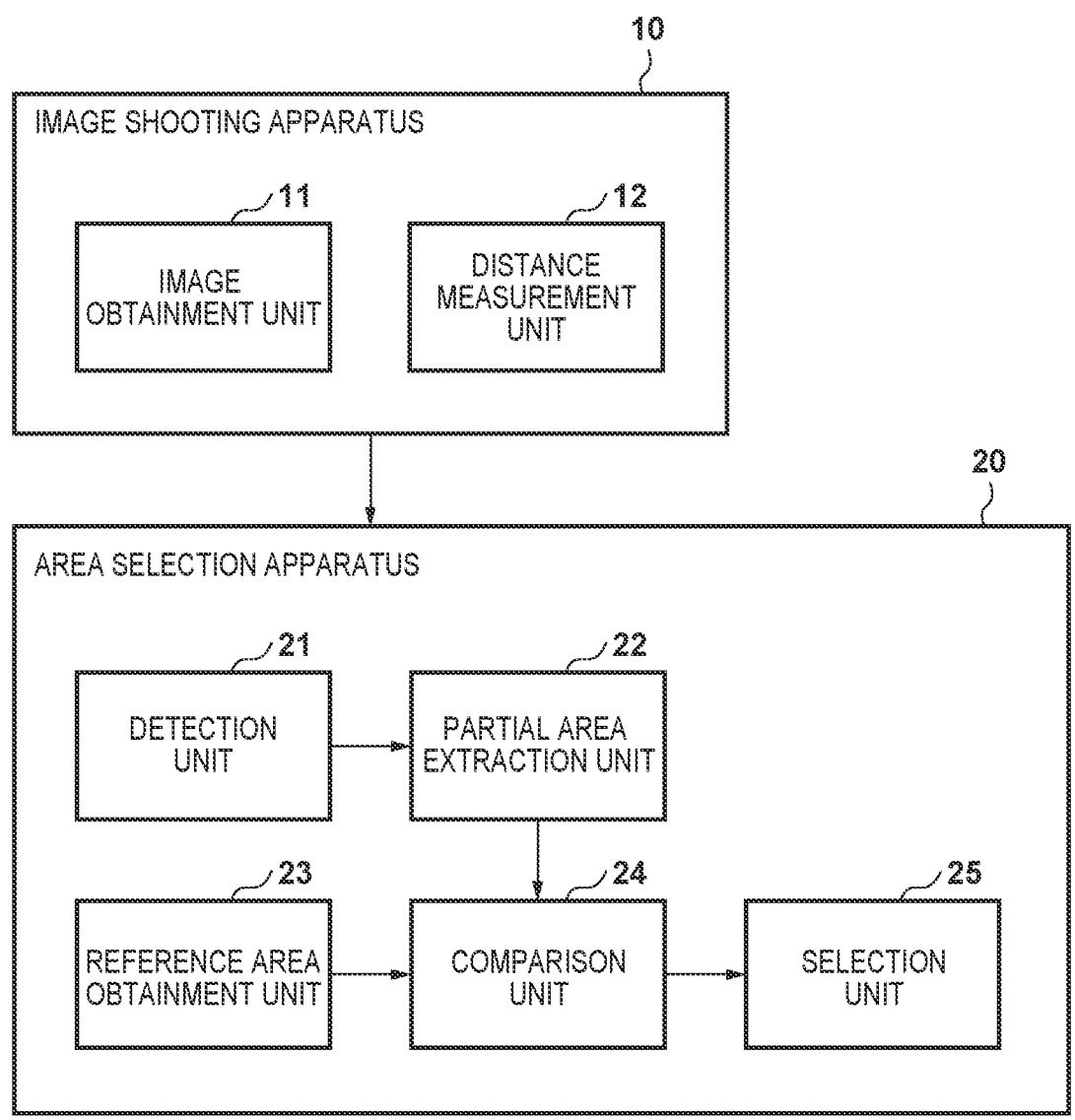
FIG. 2 is a view illustrating an example of a configuration of an AF system in a first embodiment.

FIG. 2 is a view illustrating an example of a configuration of an AF system in the first embodiment. As illustrated in FIG. 2, the AF system comprises an image shooting apparatus 10 and an area selection apparatus 20.

The image shooting apparatus 10 is a camera apparatus for imaging a scene of a surrounding environment. The image shooting apparatus 10 comprises an image obtainment unit 11 and a distance measurement unit 12. As examples of the image shooting apparatus 10, there are a digital single-lens reflex camera, a smartphone, a wearable camera, a network camera, Web camera, and the like. However, the image shooting apparatus 10 is not limited to these examples and may be any apparatus capable of imaging a surrounding scene.

The image obtainment unit 11 images a surrounding scene of the image shooting apparatus 10 using an image capturing element or the like and then outputs it to the area selection apparatus 20. The image that the image obtainment unit 11 obtains may be raw data prior to demosaicing processing or an image in which all the pixels have an RGB value due to demosaicing or the like. Also, the image may be an image for live view.

The distance measurement unit 12 comprises a ranging function for measuring depth information, which is a distance between the image shooting apparatus 10 and a subject, and outputs the measured depth information to the area selection apparatus 20. It is assumed that depth information can be associated with each pixel or area of an image that the image obtainment unit 11 obtains. Also, depth information is any information that correlates to a length of a spatial distance. For example, it may be the spatial length itself or a defocus amount based on a phase difference sensor for detecting a phase difference of incident light, or the like. Also, it may be the amount of change in the contrast of an image when the focal plane of a lens has been moved.

The area selection apparatus 20 (image processing apparatus) detects an area of a human body based on an image inputted from the image shooting apparatus 10, and depth information. Then, the area selection apparatus 20 selects from among the detected areas a focus target area which is a target on which to adjust focus. The area selection apparatus 20 comprises a detection unit 21, a partial area extraction unit 22, a reference area obtainment unit 23, a comparison unit 24, and a selection unit 25. Note that in FIG. 2, the area selection apparatus 20 is illustrated as a separate body from the image shooting apparatus 10; however they may be configured as an integrated apparatus. Also, in a case where they are configured as separate bodies, they may be connected by a wired or wireless communication function. Also, each functional unit of the area selection apparatus 20 may also be realized by a central processing unit (CPU) executing a software program.

Figure 6:
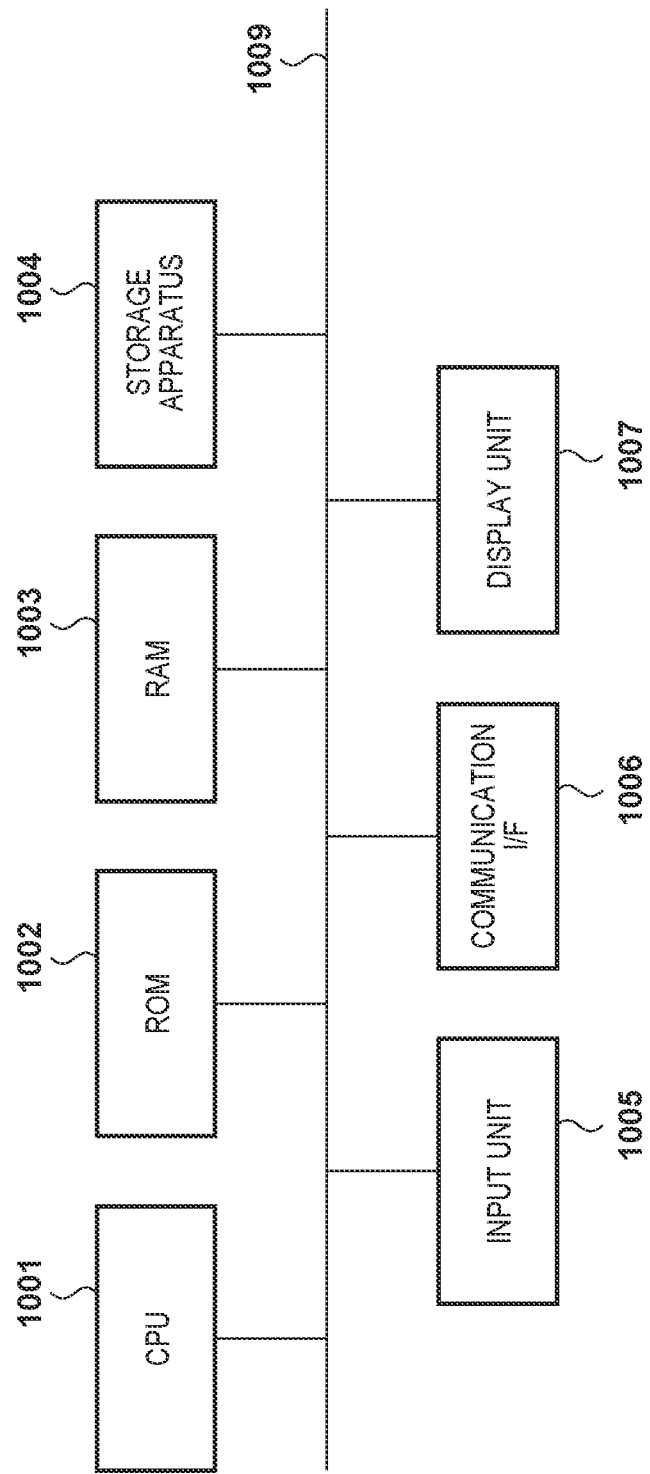
FIG. 6 is a view illustrating a hardware configuration of an image processing apparatus.

FIG. 6 is a view illustrating a hardware configuration of an information processing apparatus. A CPU 1001 reads out and executes an OS and other programs stored in a ROM 1002 or a storage apparatus 1004 using a RAM 1003 as a work memory. Then, the CPU 1001 performs computation and logical determination for various kinds of processing, and the like by controlling each component connected to a system bus 1009. In the processing that the CPU 1001 executes, information processing of the embodiment is included. The storage apparatus 1004 is a hard disk drive, an external storage apparatus, or the like and stores programs and various kinds of data concerning information processing of the embodiment. An input unit 1005 is an image capturing apparatus such as a camera and input devices such as a button, keyboard, and touch panel for inputting a user instruction. Note that the storage apparatus 1004 is connected to the system bus 1009 via an interface such as, for example, SATA, and the input unit 1005 is connected to the system bus 1009 via a serial bus such as, for example, a USB; however, the details thereof will be omitted. A communication I/F 1006 performs communication with an external device via wireless communication. A display unit 1007 is a display.

The detection unit 21 detects a human body area in an image and outputs it to the partial area extraction unit 22. The human body area may correspond to the whole body or to a specific body part such as the face or torso. The method of detecting the human body area is not limited to a specific method. It is possible to use a method to which an object detection method as described in, for example, "Joseph Redmon, Ali Farhadi, "YOLOv3: An Incremental Improvement", arXiv e-prints (2018)" is applied. Also, detection may be performed based on an outline shape of a head portion, arms and legs, or the like. Furthermore, detection may be performed based on movement information extracted from chronological images. Also, configuration may be taken so as to detect from heat source information based on far-infrared rays or the like.

The human body area to be a detection target may correspond to a predetermined body part or a user-selected body part. For example, configuration may be taken so as to provide a function for setting a category of a body part such as the face or torso and perform detection processing that corresponds to the category that the user has set. Also, configuration may be taken so as to automatically set corresponding detection processing based on information of an area that the user selected using a touch panel, for example.

In a case where the detection unit 21 detects a plurality of human body areas, one or more corresponding human body areas may be selected and then outputted based on a reference area which will be described later. For example, selection may be made based on a distance to the reference area or image-related similarity.

The partial area extraction unit 22, based on a human body area or depth information, extracts one or more partial areas that satisfies a predetermined condition and then outputs it to the comparison unit 24. The extraction of a partial area is performed based on a distance in an image space and depth information similarity.

For example, in a case where the depth information of each pixel in a human body area is inputted, a group in which the distances in the image space between the pixels is short and for which depth information of the pixels is similar may be extracted as a partial area. At this time, a closed area contained in the partial area may be merged with the partial area or may be extracted as a different partial area. Also, extraction may be performed with a threshold arranged for the distance between pixels or an area of a partial area.

In a case where, as another method, the distance measurement unit 12 measures depth information for a specific distance measuring area, for example, a distance measuring area whose depth information distribution is less than or equal to the threshold may be extracted as a partial area among each distance measuring area in the human body area.

The reference area obtainment unit 23 obtains a reference area which is a specific portion to be a target of AF and then outputs it to the comparison unit 24. The method of obtaining a reference area is not limited to a specific method. For example, a photographer, by tapping a live-view screen of a camera, may set the tapped area as a reference area. Also, an area of a face that is close to the center of the screen and appears larger may be set as a reference area using a face detection method, for example. In a case where a detection method is used, the detection method may be the same or different from that of the detection unit 21. Here, it is assumed that the reference area (first area) is stored as a focus target area in a first image shot at a first point in time, which is the time of starting AF. Note that at the time of starting shooting, a predetermined area (e.g., the center of the screen) of an initial image is set in advance as a reference area.

The comparison unit 24 compares the partial area inputted from the partial area extraction unit 22 and the reference area inputted from the reference area obtainment unit 23 and outputs the comparison result to the selection unit 25.

An element (hereinafter referred to as a comparison element) to be a target of comparison by the comparison unit 24 includes depth information and may be information of a plurality of different types. For example, the element may include a relative position in an image space between the reference area and the partial area or a pixel value in an image that corresponds to an area. Also, in a case where a relative position in an image space is used, configuration may be taken so as to normalize the size of the relative position based on depth information. For example, the value of the relative position may be small for an area whose distance from the camera is small and the value of the relative position may be large for an area whose distance is large.

However, the method of comparison of the comparison unit 24 is not limited to a specific method. For example, configuration may be taken so as to average the comparison element of each area and output the difference in the average values as a comparison result. Also, in a case where the shape of the partial area and the reference area are the same, configuration may be taken so as to output as a comparison result the difference in the comparison elements for each corresponding pixel. Also, configuration may be taken so as to compare the distribution of depth information in an area and output as a comparison result an index such as the Kullback-Leibler divergence.

Furthermore, configuration may be taken such that the comparison unit 24, based on a temporal change in the depth information of an object of interest, estimates the amount of change in the depth information from a point in time when the reference area was obtained and compares the estimated depth information and the depth information of a partial area. In such a case, there are cases where it is possible to realize more stable AF also for a subject whose distance from the camera dynamically changes with the passing of time.

The selection unit 25 selects a focus target area for the current input image based on a result of comparison of the reference area and each partial area inputted from the comparison unit 24 and outputs it to the image shooting apparatus 10. As an example of a method by which the selection unit 25 selects a focus target area, there is a method of selecting a partial area that is similar to the reference area (i.e., a difference from a depth of the reference area is relatively small) in a result of comparison with the reference area. According to this method, it is possible to continue AF on an area that is similar to the reference area.

Also, configuration may be taken so as to not only use the comparison result but also evaluate for each partial area a degree of priority of selection as a focus target area and increase the likelihood of selection for those with a high degree of priority. For example, in a case where there are a plurality of partial areas whose difference from the depth of the reference area is less than the predetermined value, configuration may be taken so as to increase the degree of priority as the area increases. Also, configuration may be taken so as to increase the degree of priority the closer it is to the center of an image, for example. Furthermore, the selection unit 25 may determine a focus target area in a second image based on a plurality of criteria. For example, the plurality of criteria include respective criteria for a similarity between the first area and the second area and the area of one or more partial area.

Furthermore, configuration may be taken so as to change a criterion for selecting a focus target area in accordance with an elapsed time from the time when the reference area was obtained. For example, configuration may be taken such that in a case where the elapsed time is short, those with a close similarity in a result of comparison with the reference area are prioritized and the longer the elapsed time gets, selection is made with an emphasis on prioritization criteria other than the comparison result, such as an area of a partial area. Also, in a case where a comparison result includes a plurality of types of elements, configuration may be taken so as to perform selection in which the level of similarity for each element is taken into account using different weights.

<Operation of Apparatus>

Figure 3:
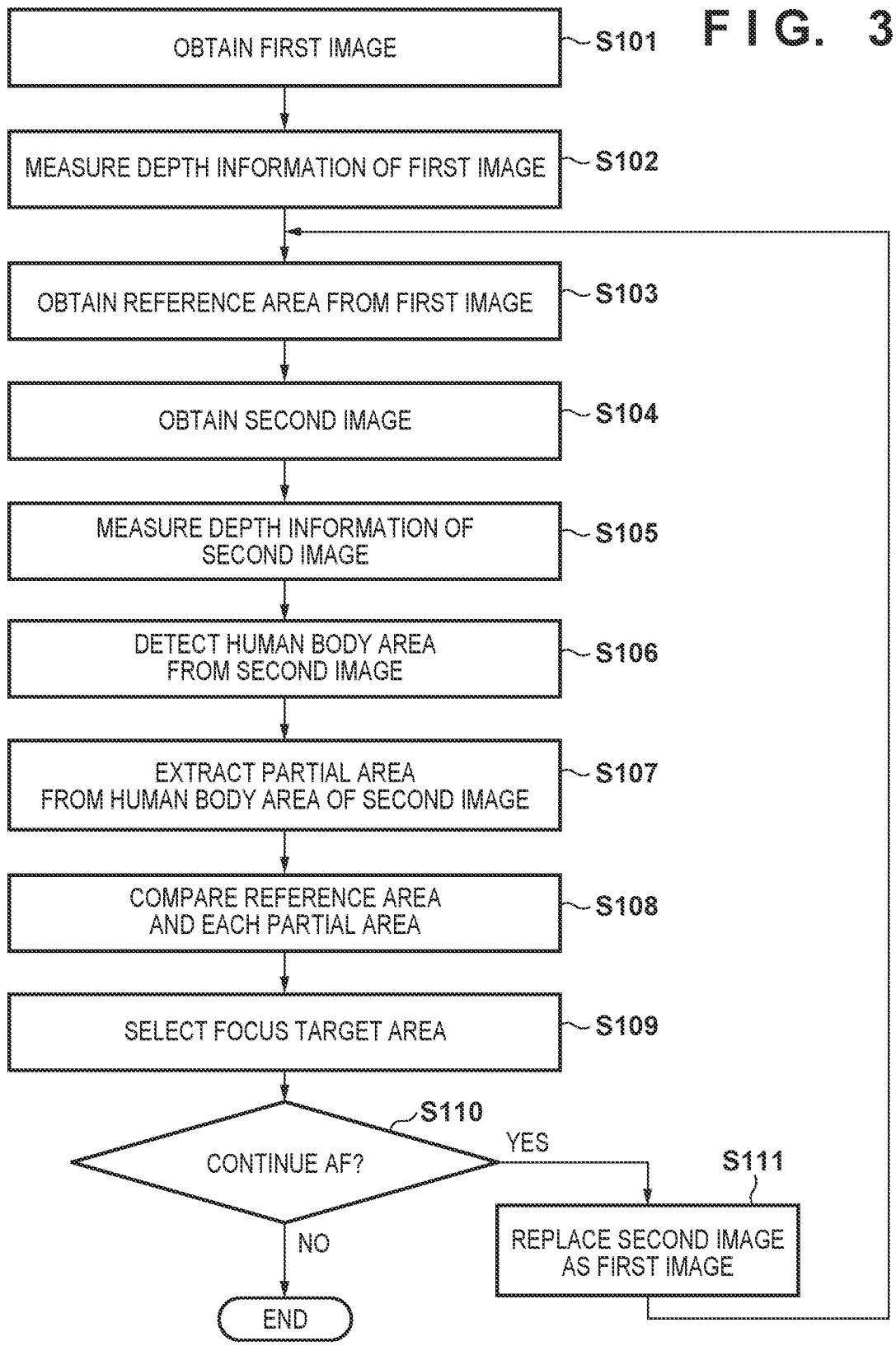
FIG. 3 is a flowchart describing processing that the AF system executes in the first embodiment.

FIG. 3 is a flowchart describing processing that the AF system executes in the first embodiment. Steps S101 to S111 respectively represent specific processing and as a general rule, are executed in order. However, the AF system does not necessarily have to perform all of the processing described in this flowchart, and the execution order of processing may be changed. Furthermore, a plurality of processes may be executed in parallel.

In step S101, the image obtainment unit 11 obtains an image (first image) of a point in time (time t-1) of starting AF. For example, it obtains alive-view RGB image. Also, in step S102, the distance measurement unit 12 measures depth information of the point in time of starting AF. For example, in a case where the distance measurement unit 12 comprises a phase difference sensor, a defocus amount is measured. Note that the measured depth information will be obtained (depth information obtainment) in succession by the area selection apparatus 20.

In step S103, the reference area obtainment unit 23 obtains a reference area (first area) of a point in time (first point in time) of starting AF. In other words, an area that was being used as the focus target area at the point in time of starting AF is obtained (reference obtainment). For example, an area that the user selected using a touch panel or an area of an automatically detected face or human body is obtained. In a case of obtaining the reference area based on detection processing, the detection unit 21 or the like may be used. Also, in a case where there are a plurality of reference area candidates, the reference area may be selected using the selection unit 25 or the like. Also, in a case where continuous shooting is being performed, the preceding in-focus area may be obtained.

In step S104, the image obtainment unit 11 obtains an image (second image) of a point in time (time t, second point in time) of selecting a focus target area. The point in time of selecting a focus target area is a time that succeeds the point in time of starting AF. Note that the first point in time and the second point in time do not need to be continuous times, and for example, a focus position may be changed at a fixed interval. In step S105, the distance measurement unit 12 measures depth information of the point in time of selecting the focus target area. Note that the measured depth information will be obtained (depth information obtainment) in succession by the area selection apparatus 20.

In step S106, the detection unit 21 detects from the image obtained in step S104 a human body area (second area) to be a candidate for focus target. For example, a predetermined object (an area such as the face or whole body of a person, an animal such as a dog or a cat, a car, or a building) to be a target of focus is detected. An area whose image feature is similar to that of the reference area may be detected as the second area. For example, the second area may be detected using deep learning or semantic segmentation. Also, an area whose depth is a predetermined range may be detected as the second area based on depth information that corresponds to the image obtained in step S104. For example, when the subject is only one person or the like, an area on the near side (i.e., an area indicating a similar depth) may be detected. In such a case, step S107 may be skipped. Then in step S107, the partial area extraction unit 22 extracts form the human body area detected in step S106 one or more partial areas that satisfies the predetermined condition. For example, a partial area is extracted based on the depth information and more specifically, a partial area whose depth indicated by the depth information is included in a range of the depth of field is extracted.

The processing of step S107 will be described with reference to FIG. 1. In step S107, criteria for extracting the partial area is changed based on the depth of field. For example, in a case where the subject G-1 (an upright human body) is detected, the distance from the camera across the human body area is mostly constant (e.g., the calculated difference in the depth is 50 cm or less). Accordingly, the entire human body area can generally be extracted as one partial area. However, in a case where the depth of field of the image shooting apparatus is narrow (e.g., a few cm), configuration may be taken so as to extract each partial area in which the distances from the image shooting apparatus are close to each other, such as with eyes, nose, arms, and legs.

As an example of a method of extracting a partial area whose distances from the camera are close to each other, there is a method of using k-means clustering or the like for example. More specifically, a cluster of pixels whose depth information indicates that they are neighbors are extracted and each cluster is extracted as a partial area. At this time, configuration may be taken so as to take into account or ignore the distance between pixels on the image.

In step S108, the comparison unit 24 compares the reference area obtained in step S103 and each partial area extracted in step S107. For example, the comparison unit 24 compares the distribution of depth information between the reference area and each partial area, and an image feature in the reference area and an image feature in the extracted partial area.

Figure 4:
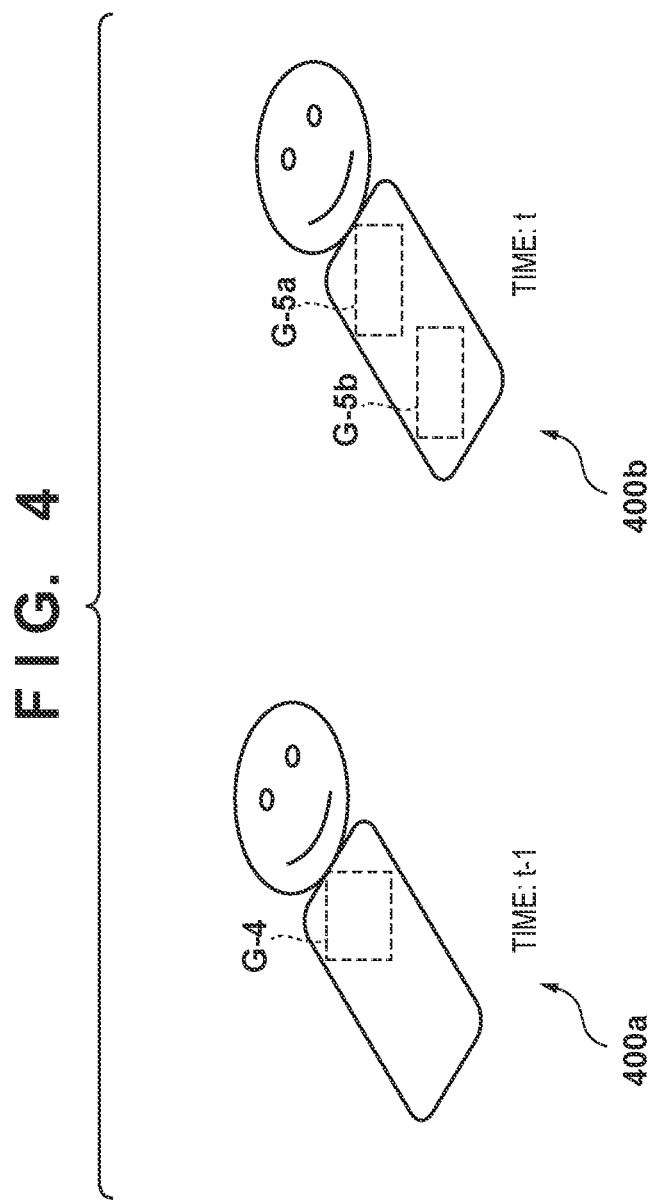
FIG. 4 is a view describing a comparison (step S108) of a reference area and each partial area.

FIG. 4 is a view describing the comparison of the reference area and each partial area in step S108. An image 400a indicates an area G-4 which is a reference area obtained from the first image. Also, an image 400b indicates an area G-5a and an area G-5b which are partial areas extracted from the second image. In step S108, for example, configuration may be taken so as to obtain an average of the depth from the depth information for the reference area and each partial area, respectively, and output as a comparison result an absolute value of the difference in the average of the depth based on the depth information between the reference area and the partial area. In the example illustrated in FIG. 4, the area G-5a is closer to the area G-4 than the area G-5b. Accordingly, a smaller difference in depth information is outputted as a comparison result. Also, in a case of comparing using image features, the similarity between an image feature in the reference area and an image feature in the extracted partial area and a preset threshold are compared. If the similarity is greater than or equal to the threshold, they are similar and there is a high possibility that they may be the same body part. Meanwhile, if the similarity is less than the threshold, they are not similar, accordingly, there is a high possibility that they may be a different body part.

In step S109, the selection unit 25 selects a partial area based on the comparison result and determines it as a focus target area. Here, a partial area having an average depth closest to the average depth of the reference area is determined as a focus target area. Instead of an average value of depth in an area, the depth of a representative position may be used. Also, a partial area with the smallest (smaller than predetermined value) difference in the depth may be determined as a focus target area. As described above, determining an area with the closest depth leads to reduction in the time it takes to adjust focus. Furthermore, as an example of a method of selecting focus target area, configuration may be taken so as to select a partial area that is most similar to the reference area, for example. Also, configuration may be taken so as to select a partial area with the largest area among the partial areas whose difference from the reference area is less than or equal to the threshold in the comparison result. A plurality of selection criteria may be combined.

In step S110, the area selection apparatus 20 determines whether to continue the AF processing. In a case of continuing the AF processing, the processing advances to step S111 and in a case of not continuing, the processing is ended. In step S111, the area selection apparatus 20 replaces the first image with the second image. Then, the processing returns to step S103 and is repeated.

The above processing makes it possible to suitably select an area in the current (time t) image that corresponds to the reference area which had been selected as an AF target immediately prior (time t−1) thereto.

As described above, by virtue of the first embodiment, a partial area that is suitable for AF in a detected human body area is selected as a focus target area using the information of a reference area. In particular, a partial area with a smaller difference from (a higher similarity to) the reference area is selected. This makes it possible for the AF system to continuously execute suitable AF even in a case where the difference in depth in the detected area is large.

Note that in the above description, a case where a human body area is detected was described; however, the present invention may be applied to detection targets other than a human body area. For example, an animal other than a human may be detected or a specific object such as a vehicle may be detected. Also, it can be used not only in shooting with a digital camera but also in a system for changing a focus position after shooting by post-processing, or the like.

Second Embodiment

In a second embodiment, an embodiment that handles a case where a body part category of the reference area and the focus target area are different will be described. In the following, an example in which in a case where detection is performed for a head portion and a torso portion based on an image obtained from a camera or the like and the head portion is not detected, a focus target area is selected from a partial area of the torso portion will be described.

Note that here, the term, "torso portion" refers to a trunk portion of a person not including the head portion. However, the torso portion may include the neck, arms, legs, and the like in addition to the trunk portion. Also, instead of the entire trunk portion, it may be a body part such as the chest or abdominal portion.

A configuration of the AF system in the second embodiment is substantially the same that of the first embodiment (FIG. 2). However, operation of each functional unit is different from the first embodiment; accordingly, the parts that are different from the first embodiment will be described in the following.

Figure 7:
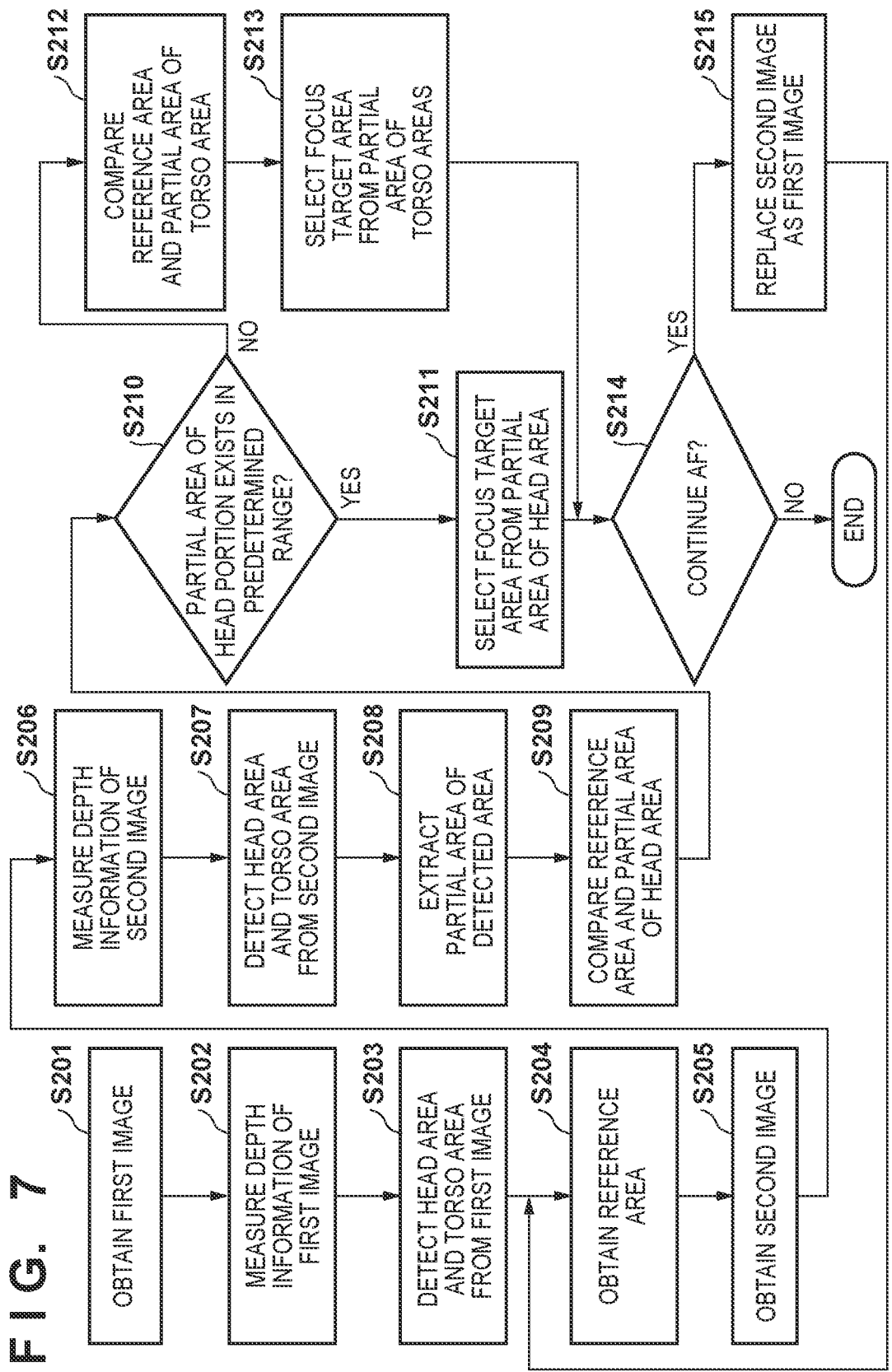
FIG. 7 is a flowchart describing processing that the AF system executes in a second embodiment.

FIG. 7 is a flowchart describing processing that the AF system executes in the second embodiment. Steps S201 to S215 each represent specific processing. In steps S201 and S202, the first image and the depth information thereof are obtained. The processing performed in steps S201 and S202 is the same as in steps S101 and S102 in the first embodiment; accordingly, description will be omitted.

In step S203, the detection unit 21 detects a head area and a torso area of a human body from the first image and outputs it to the partial area extraction unit 22 and the reference area obtainment unit 23. The method of detecting the torso area is not limited to a specific method. For example, configuration may be taken so as to directly detect the torso portion using a semantic segmentation method or detect the torso portion by detecting a body part included in the torso portion such as shoulders or hips using an object detection method.

Figure 5:
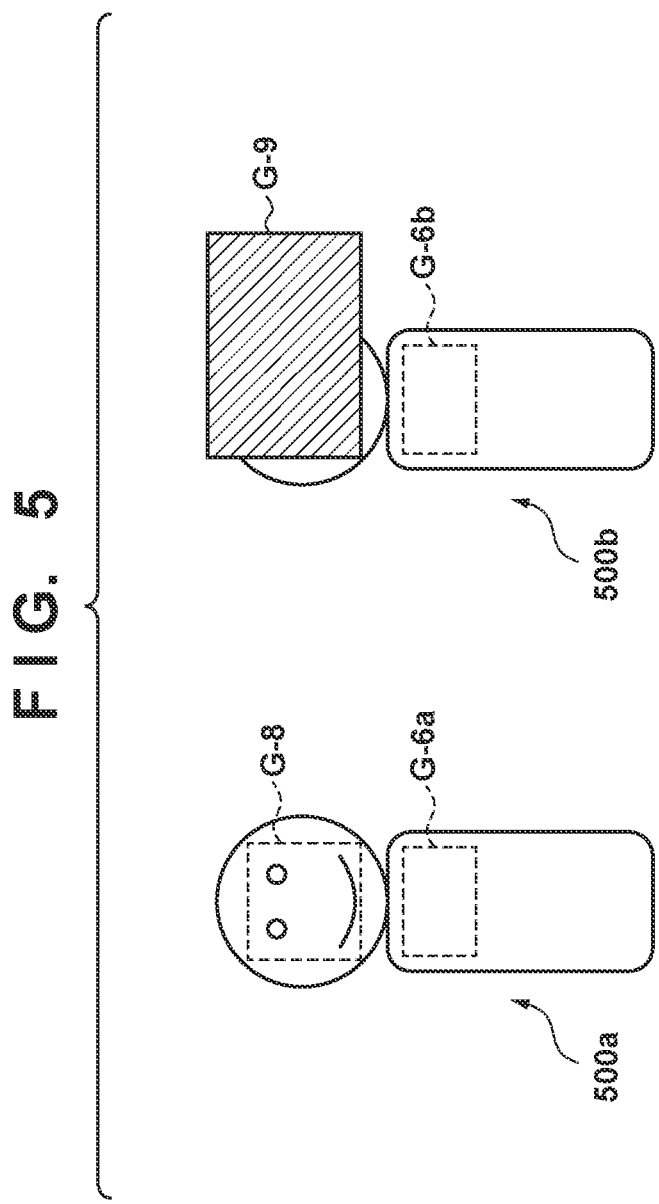
FIG. 5 is a view illustrating an example of detection of a head portion and a torso portion of a human body.

FIG. 5 is a view illustrating an example of detecting a human body. An image 500a indicates an example of a case where the detection unit 21 detects the head portion and the torso portion. An area G-8 and an area G-6a are the detected head portion and torso portion. Meanwhile, an image 500b indicates an example of a case where the head portion is occluded by a structure (area G-9) and the detection unit 21 detects only a torso portion G-6b.

The size and position of the portion to be detected as a torso portion such as the areas G-6a and G-6b do not necessarily have to correspond to the entire trunk. Also, the portion does not necessarily have to be expressible in a rectangle and may be of any shape such as an ellipse or a polygon. Also, it may be expressed as a distribution.

In step S204, the reference area obtainment unit 23 obtains a reference area to be an AF target from the first image and outputs it to the comparison unit 24. The position of the reference area, similarly to step S103 of the first embodiment, is designated using designation by the user or a result of detection by the detection unit 21. In the following description, a reference area will be described assuming that the head portion is to be preferentially selected; however, the present invention is not limited to head portion prioritization. In a case of prioritizing the torso portion, the head portion and the torso portion in the following description can be swapped.

If the designated position is a head area as indicated by the area G-8 of the image 500a, that head area will be set as the reference area. The head area that the reference area obtainment unit 23 obtains may be an area of a part, such as the face, included in the head portion as in the area G-8 instead of the entire head portion. In a case where the designated position is a torso area as indicated by the area G-6a of the image 500a, the area G-8 which is a head area at a position closest to the designated position is selected as the reference area. In a case where the designated position is a torso area as indicated by an area G-6b of the image 500b and there is no corresponding head area, the area G-6b which is the designated position is selected as the reference area.

Hereinafter, description will not be shown in the figure for a case where the torso area is designated as the reference area; however, the processing is the same as in a case where the head area is designated as the reference area. In a case where continuously shooting is performed, a focus target area selected at the preceding time is set as the reference area.

In steps S205 and S206, the second image and the depth information thereof are obtained. The processing performed in steps S205 and S206 is the same as in steps S104 and S105 in the first embodiment; accordingly, description will be omitted.

In step S207, the detection unit 21 detects the head area and the torso area from the second image. In step S208, the partial area extraction unit 22 extracts a respective partial area based on depth information for each of the head area and the torso area detected from the second image. As for a specific method of extracting a partial area, detailed description has already been given in step S107 of the first embodiment; accordingly, it will be omitted here.

In step S209, the comparison unit 24 performs comparison processing on the reference area obtained from the first image and the partial area that belongs to the head area detected in the second image using respective depth information in the image. Regarding a specific method of comparing the reference area and the partial area, it is the same as the method described in step S108 of the first embodiment.

In step S210, the selection unit 25 verifies the comparison result obtained in step S209. As verification content, it is determined whether there is a partial area of the head portion in a predetermined range of the second image. Here, the predetermined range is a tracking range in continuous shooting; however, the size thereof is not limited to a specific range. For example, since a tracking target is a human, the size of the predetermined range is set from a commonsensical movement speed of a human, and a continuous shooting frame rate. If there is a partial area of the head portion in the predetermined range as a verification result, the processing advances to step S211 and in a case where there is none, the processing advances to step S212. As for the case where there is no partial area of the head portion in the predetermined range, a case where the head area is occluded as in an image 900b, a case where head portion detection has failed, or the like, for example is considered.

In step S211, the selection unit 25 selects a focus target area. For example, by the same procedure as step S109 of the first embodiment, a focus target area is selected from partial head areas G-11a and G-11b in the second image indicated by an image 800*b* in relation to a reference area G-10 in the first image indicated by an image 800*a*. Then, the processing is advanced to step S214.

In step S212, the comparison unit 24 performs comparison processing on the reference area obtained from the first image and the partial area that belongs to the torso area detected in the second image using respective depth information in the image. Regarding a specific method of comparing the reference area and the partial area, it is the same as the method described in step S108 of the first embodiment. When the comparison processing is ended, the processing is advanced to step S213.

In step S213, the selection unit 25 determines a focus target area from the comparison result obtained in step S212. For example, by the same procedure as step S109 of the first embodiment, a focus target area is selected from partial torso areas G-7*a* and G-7*b* in the second image indicated by the image 900*b* in relation to the reference area G-10 in the first image indicated by an image 900*a*. Then, the processing is advanced to step S214.

In step S214, the area selection apparatus 20 determines whether to continue the AF processing. In a case of continuing the AF processing, the processing advances to step S215 and in a case of not continuing, the processing is ended. In step S215, the area selection apparatus 20 replaces the first image with the second image. Then, the processing returns to step S204 and is repeated.

As described above, by virtue of the second embodiment, in a case where the body part that was the reference area in the preceding image cannot be detected in the processing target image due to occlusion or the like, a partial area that is suitable for AF in the detected human body area is selected as a focus target area. This makes it possible for the AF system to continuously execute suitable AF even in a case where there is occlusion or the like.

Note that in the present embodiment, a case where the detection unit 21 detects the torso area and the reference area obtainment unit 23 obtains the reference area based on the head area was described; however, application is possible also for those other than the combination of the head portion and the torso portion. For example, it may be a combination of the face and the whole body or a combination of one person and a crowded group of people. Also, it may also be a combination of a vehicle number plate and the entire vehicle body.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-154008, filed Sep. 14, 2020, and 2021-096752, filed Jun. 9, 2021 which are hereby incorporated by reference herein in its their entirety.

What is claimed is:

1. An image processing apparatus operable to determine a focus target area of an image capturing apparatus, the image processing apparatus comprising:
   one or more processors; and
   a memory for storing instructions to be executed by the one or more processors, wherein, when the instructions stored in the memory are executed by the one or more processors, the image processing apparatus functions as:
      an obtainment unit configured to obtain a first area to be a focus target in a first image captured by the image capturing apparatus at a first point in time;
      a detection unit configured to detect a second area to be a focus target candidate from a second image captured by the image capturing apparatus, the second image being captured by the image capturing apparatus at a second point in time succeeding the first point in time; and
      a determination unit configured to determine, based on the first area and the second image, a focus target area in the second image from among one or more partial areas in the second area.

2. The image processing apparatus according to claim 1, wherein, when the instructions stored in the memory are executed by the one or more processors, the image processing apparatus further functions as:
   a depth information obtainment unit configured to obtain depth information for each area of an image captured by the image capturing apparatus, and
   wherein the determination unit determines, based on depth information that corresponds to the first area and depth information that corresponds to the second area, the focus target area in the second image.

3. The image processing apparatus according to claim 1, wherein
   the determination unit determines, based on a difference in depth calculated according to depth information that corresponds to the first area and depth information that corresponds to the second area, the focus target area.

4. The image processing apparatus according to claim 3, wherein
   the determination unit determines, from among the one or more partial areas, a partial area for which a difference between a depth of the first area and a depth of the partial area is smaller than a predetermined threshold as the focus target area.

5. The image processing apparatus according to claim 4, wherein
the determination unit, in a case where there are a plurality of partial areas for which a difference with respect to the depth of the first area is less than a predetermined value, determines, from among the plurality of partial areas, a partial area whose area is relatively large or depth is relatively small as the focus target area.

6. The image processing apparatus according to claim 2, wherein
the depth information is based on a distance between the image capturing apparatus and a subject or a phase difference of incident light on an image capturing element of the image capturing apparatus.

7. The image processing apparatus according to claim 1, wherein
the detection unit detects, in the second image, an area having an image feature that is similar to an image feature extracted from the first area as the second area.

8. The image processing apparatus according to claim 7, wherein
the obtainment unit obtains a specific portion of a person or object as the first area, and
the detection unit detects a portion that is the same as the specific portion as the second area.

9. The image processing apparatus according to claim 8, wherein
the obtainment unit obtains the specific portion of the person or object as the first area, and
the detection unit, in a case where the portion that is the same as the specific portion cannot be detected, detects a portion that is different from the specific portion as the second area.

10. The image processing apparatus according to claim 1, wherein, when the instructions stored in the memory are executed by the one or more processors, the image processing apparatus further functions as:
an extraction unit configured to extract, from the second area, one or more partial areas that meets a predetermined condition, and
wherein the determination unit determines the focus target area in the second image from among the one or more partial areas extracted by the extraction unit.

11. The image processing apparatus according to claim 10, wherein
the extraction unit extracts, from the second area, an area whose depth indicated by depth information that corresponds to the second image is included in a predetermined range as the one or more partial areas.

12. The image processing apparatus according to claim 10, wherein
the extraction unit, based on a depth of field when the image capturing apparatus captured the second image, changes the predetermined condition of the one or more partial areas.

13. The image processing apparatus according to claim 1, wherein
the determination unit, based on a plurality of criteria, determines the focus target area in the second image, and
the plurality of criteria include respective criteria for a similarity between the first area and the second area and an area of the one or more partial areas.

14. The image processing apparatus according to claim 13, wherein
the determination unit changes the plurality of criteria of the focus target area based on an elapsed time from the first point in time.

15. The image processing apparatus according to claim 1, wherein
the second area is an area that indicates a head portion and/or a torso portion of a person.

16. The image processing apparatus according to claim 1, wherein
the determination unit preferentially determines, from among the one or more partial areas, a partial area whose area is larger than a predetermined value as the focus target area in the second image.

17. A method of controlling an image processing apparatus operable to determine a focus target area of an image capturing apparatus, the method comprising:
obtaining a first area to be a focus target in a first image captured by the image capturing apparatus at a first point in time;
detecting a second area to be a focus target candidate from a second image captured by the image capturing apparatus, the second image being captured by the image capturing apparatus at a second point in time succeeding the first point in time; and
determining, based on the first area and the second image, a focus target area in the second image from among one or more partial areas in the second area.

18. A non-transitory computer-readable recording medium storing a program that causes a computer to function as an image processing apparatus operable to determine a focus target area of an image capturing apparatus, the image processing apparatus comprising:
one or more processors; and
a memory for storing instructions to be executed by the one or more processors, wherein, when the instructions stored in the memory are executed by the one or more processors, the image processing apparatus functions as:
an obtainment unit configured to obtain a first area to be a focus target in a first image captured by the image capturing apparatus at a first point in time;
a detection unit configured to detect a second area to be a focus target candidate from a second image captured by the image capturing apparatus, the second image being captured by the image capturing apparatus at a second point in time succeeding the first point in time; and
a determination unit configured to determine, based on the first area and the second image, a focus target area in the second image from among one or more partial areas in the second area.

* * * * *